UNITED STATES PATENT OFFICE.

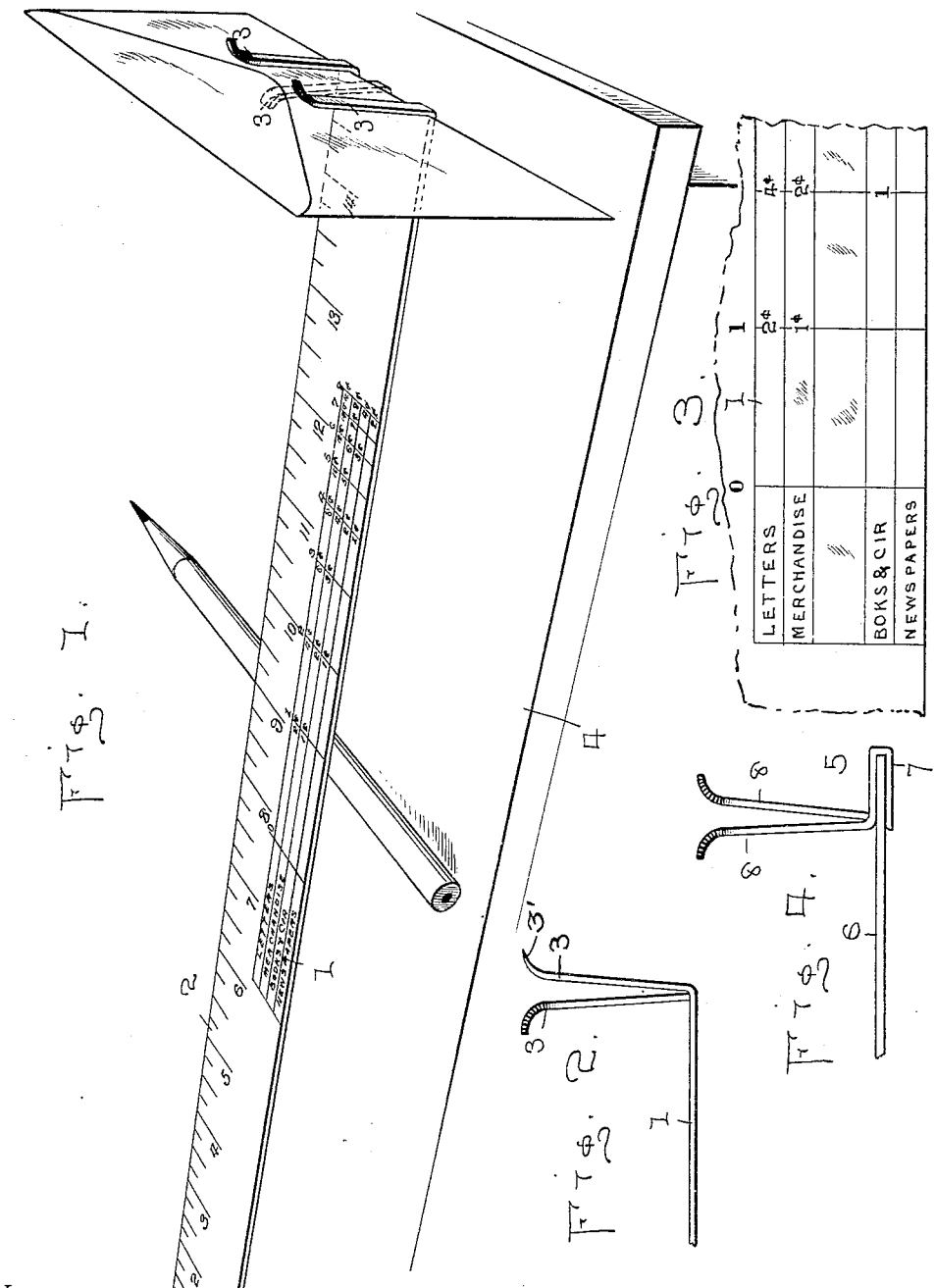

CHARLES CLEOPHAS, OF BELOIT, WISCONSIN.

COMBINED RULER AND POSTAL SCALE.

1,126,398.

Specification of Letters Patent. Patented Jan. 26, 1915.

Application filed December 30, 1913. Serial No. 809,548.

*To all whom it may concern:*

Be it known that I, CHARLES CLEOPHAS, a citizen of the United States, residing at Beloit, in the county of Rock and State of Wisconsin, have invented a Combined Ruler and Postal Scale; and I do hereby declare the following to be a full, clear, and exact description of the invention, such as will enable others skilled in the art to which it appertains to make and use the same.

My invention relates to a weighing and measuring device.

The object of my invention is to provide a device which may be used as a ruler and so formed and marked as to be used in weighing letters or packages, when it is desired to determine the weight of the letter or package with a view to placing thereupon the proper amount of postage to carry the same through the mails.

Other objects and advantages of my invention will be hereinafter made clearly apparent in the specification and pointed out in the claims.

In the accompanying drawings I have shown the preferred forms which my invention may take.

In said drawings, Figure 1 is a perspective view showing my invention in use. Fig. 2 is an elevation showing one end of the device. Fig. 3 is a detail view on an enlarged scale showing one form of weighing index, and, Fig. 4 is an elevation showing a modified form of my invention.

Referring to the drawings, in which similar reference numerals designate corresponding parts throughout the several views, 1 is the body of my invention, which is preferably formed of a rectangular strip of material. One side of the body of the strip of material is preferably scaled, as indicated at 2, so that the same may be used in measuring any object and the sides of the strip may also be used when it is desired to draw a straight line.

Referring particularly to Figs. 1 and 2, it will be seen that I have formed the strip of material 1 of metal and cut away one end of said strip to form tongues 3. The side edges of the strip may be at right angles to the surface of the strip or may be beveled, as desired. In practice I preferably employ three tongues 3, which are bent upwardly from the body of the strip 1, so that the opening appearing between the tongues, when viewed from the side, will be substantially at right angles to the body 1. The upper end of the central tongue 3 is bent toward the length of the strip 1, and the upper ends of the other two tongues shown are bent away from the length of said strip, as clearly shown in the drawings for a purpose hereinafter clearly set forth.

In practice my device is adapted to be placed over an object, such as a knife blade, a round pencil or other suitable object, and the point at which the device balances is indicated by the mark 0, likewise the points at which the device balances when objects weighing one to eight or more ounces, when placed between or upon the upper ends of the tongues 3, are indicated upon the body.

In Fig. 1, I have indicated my device as being used to weigh a letter, which has been inserted between the tongues 3. The device is placed over a pencil, which is resting upon the upper surface of a table or other flat surface 4, and the device has been rolled over said pencil until the ends balance. As indicated the letter weighs slightly less than one ounce. The surface of the body 1 may be provided with a table, as indicated in Fig. 3, and by referring to said table it will be seen that the letter which has been weighed will cost two cents to send through the mail. Should it be desired to weigh a package of such shape that it could not be placed between the tongues 3, it would only be necessary to place the package on top of the tongues. The device herein described is also useful when it is desired to open sealed letters or packages, as it is only necessary to pass one of the tongues 3 between the flap and the body of the envelop or package wrapper. If desired one of the tongues may be beveled so as to facilitate the opening of letters or packages therewith.

Referring particularly to Fig. 4, it will be seen that I have provided a clip 5, which is adapted to be slipped on the end of an ordinary form of straight ruler 6. The clip 5 consists of a U-shaped portion 7, which is adapted to be slipped over the end of the ruler and to grip the upper and lower surfaces thereof. Extending upwardly from one member of the clip 7 are tongues 8, which are bent similarly to the tongues 3.

While I have shown and described the preferred forms of my invention, it will be understood that certain modifications may be made therein without departing from the spirit and scope of my invention.

What I claim is:

1. A device of the class described, comprising a ruler adapted to be balanced upon an object to provide a weighing beam, and having a postage scale thereon and a plurality of upwardly extending tongues arranged in staggered relation at one end of said beam for the reception of letters and packages to be weighed.

2. A device of the class described, comprising a ruler adapted to be balanced upon an object to provide a weighing beam, upwardly extending tongues arranged at one end of said beam and at right angles thereto, said tongues being in staggered relation for receiving letters therebetween, said beam having a graduated postage scale arranged thereon, whereby the weight of the mail matter and amount of postage will be indicated at the point of balance.

3. A device of the class described, comprising a ruler providing a weighing beam adapted to be balanced upon a pencil or other object to provide a fulcrum, upwardly extending tongues arranged upon one end of said beam and at right angles thereto, said tongues being in staggered relation for receiving letters therebetween, the ends of the tongues being alternately curved in opposite direction to provide a support for packages, said beam having a graduated postage scale arranged thereon, whereby the weight of the mail matter and amount of postage will be indicated at the point of the fulcrum.

4. A device of the class described, comprising a ruler providing a weighing beam adapted to be balanced upon a pencil or other object to provide a fulcrum, upwardly extending tongues arranged upon one end of said beam and at right angles thereto, said tongues being in staggered relation for receiving letters therebetween, the ends of the tongues being alternately curved in opposite direction to provide a support for packages, said beam having a graduated postage scale arranged thereon, whereby the weight of the mail matter and amount of postage will be indicated at the point of the fulcrum, and means upon one of said tongues to provide a letter opener.

In testimony whereof I have signed my name to this specification in the presence of two subscribing witnesses.

CHARLES CLEOPHAS.

Witnesses:
  T. R. HARPER,
  L. H. CLEOPHAS.

Copies of this patent may be obtained for five cents each, by addressing the "Commissioner of Patents, Washington, D. C."